United States Patent
Manger et al.

(10) Patent No.: US 10,655,701 B2
(45) Date of Patent: May 19, 2020

(54) ADJUSTABLE OSCILLATION DAMPER

(71) Applicant: ZF Friedrichshafen AG, Friedrichshafen (DE)

(72) Inventors: Thomas Manger, Wasserlosen (DE); Bernd Zeissner, Volkach (DE); Stefan Schmitt, Gochsheim (DE); Lukas Ruhmann, Memmelsdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 36 days.

(21) Appl. No.: 15/992,750

(22) Filed: May 30, 2018

(65) Prior Publication Data

US 2018/0355940 A1    Dec. 13, 2018

(30) Foreign Application Priority Data

Jun. 7, 2017  (DE) .......................... 10 2017 209 609

(51) Int. Cl.
*F16F 9/32*  (2006.01)
*F16F 9/46*  (2006.01)
*F16F 9/06*  (2006.01)
*F16F 9/36*  (2006.01)

(52) U.S. Cl.
CPC .............. *F16F 9/325* (2013.01); *F16F 9/062* (2013.01); *F16F 9/369* (2013.01); *F16F 9/46* (2013.01)

(58) Field of Classification Search
CPC .. F16F 9/32; F16F 9/325; F16F 9/3257; F16F 9/34; F16F 9/46; F16F 9/464

USPC ........................................... 188/266.5, 266.6
See application file for complete search history.

(56) References Cited

U.S. PATENT DOCUMENTS

| | | | | | |
|---|---|---|---|---|---|
| 4,802,561 | A | * | 2/1989 | Knecht | F16F 9/465 188/266.6 |
| 5,586,627 | A | * | 12/1996 | Nezu | B60G 17/08 188/266.6 |
| 5,735,372 | A | * | 4/1998 | Hamilton | F16F 9/46 188/266.6 |
| 5,788,030 | A | * | 8/1998 | Rottenberger | F16F 9/34 188/290 |
| 6,321,888 | B1 | * | 11/2001 | Reybrouck | F16F 9/325 188/299.1 |

FOREIGN PATENT DOCUMENTS

DE    102005053394       5/2006
EP    2628974 A2 *       8/2013 .............. F16F 9/464

* cited by examiner

*Primary Examiner* — Thomas J Williams
(74) *Attorney, Agent, or Firm* — Cozen O'Connor

(57) ABSTRACT

An adjustable vibration damper comprises at least one adjustable damping valve for each working direction. A fluid connection between a compensation space and a working space is controlled by a check valve which has a check valve body and which is hydraulically connected in parallel with the adjustable damping valve. The check valve is held by an intermediate tube which forms the fluid connection and which has a connection orifice to the connected adjustable damping valve. The check valve body of the check valve is supported at least indirectly in the region of the connection orifice.

10 Claims, 6 Drawing Sheets

ADJUSTABLE OSCILLATION DAMPER

1. FIELD OF THE INVENTION

The present invention is directed to a vibration damper with adjustable damping force.

2. BACKGROUND OF THE INVENTION

DE 10 2005 053 394 A1 describes a vibration damper with adjustable damping force having a first adjustable damping valve for damping an extending movement of a piston rod and a second damping valve for damping a retracting movement of a piston rod. The two strictly separated switchable damping valves offer the advantage of a very large variety of characteristics. But, on the other hand, there is the disadvantage of the relatively large receptacle diameter resulting from the use of an annular check valve as part of an intermediate tube.

The aforementioned check valve serves for guiding flow between the adjustable damping valve, a fluid channel between a working space and the connected damping valve, and a compensation space. Both adjustable damping valves have a main flow direction and are connected to a common compensation space. The check valve prevents a hydraulic short circuit between a working space on the piston rod side and a working space remote of the piston rod via the compensation space.

It is an object of the present invention to further develop a generic vibration damper such that the problem of the large receptacle tube diameter is solved.

SUMMARY OF THE INVENTION

This object is met in that the check valve body of the check valve is supported at least indirectly in the region of the connection orifice.

The diameter of the vibration damper can be appreciably reduced as a result of this spatial arrangement of the check valve.

Specifically, the check valve body is supported at a connection piece forming the connection orifice. Consequently, no further holding surfaces for the check valve need be provided at the intermediate tube.

In one embodiment, the check valve body outwardly encloses the connection piece. This embodiment does not restrict the flow cross section of the connection piece, which is particularly advantageous for the return flow from the compensation space into the working space because no cavitation can occur in this case.

Alternatively, it can be provided that the check valve body engages in the connection orifice. This construction saves even more space than the embodiment described above.

The check valve body has a guide sleeve which axially overlaps the connection piece. Accordingly, the check valve body is fixed axial to the main axis of the vibration damper.

For purposes of the most economical arrangement possible with respect to installation space, the check valve body has a permanently open through-opening to the adjustable damping valve and at least one return flow orifice which is radially offset with respect to the latter. As a result of the radial arrangement, the check valve body has a simple shape which can consequently also be produced in a simple manner, e.g., as a sintered component part.

As a further step in the interest of a return flow with as little restriction as possible, the at least one return flow orifice is arranged radially outside of the permanently open through-opening.

As a further step for mechanical fixation, the check valve body has a supporting surface via which the check valve body is supported at the intermediate tube.

For a further bearing support point, it is provided that the check valve body is held by a transition piece to the adjustable damping valve.

For purposes of a constructional unit which can be preassembled, the transition piece and the check valve body can be fixedly connected to one another. In this way, this constructional unit can be fastened to the intermediate tube in a simple manner.

A closing spring of the check valve is advantageously supported at the transition piece. The closing spring provides for a defined operating position of a check valve disk and, therefore, for a defined manner of operation.

The closing spring is radially supported at the transition piece. Consequently, the check valve can be completely preassembled and its functionality can be tested outside of the vibration damper.

In one construction, it is provided that the check valve is connected in parallel with the adjustable damping valve for damping a compression movement of a working space remote of the piston rod, and the working space remote of the piston rod is separated from the compensation space via a base which is closed at the end. The bottom valve with check valve function conventionally used in a vibration damper is no longer provided in this case so that a greater displacement path can be achieved for a piston rod.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained in more detail referring to the following description of the figures in which.

DETAILED DESCRIPTION OF THE PRESENTLY PREFERRED EMBODIMENTS

Figure 1:
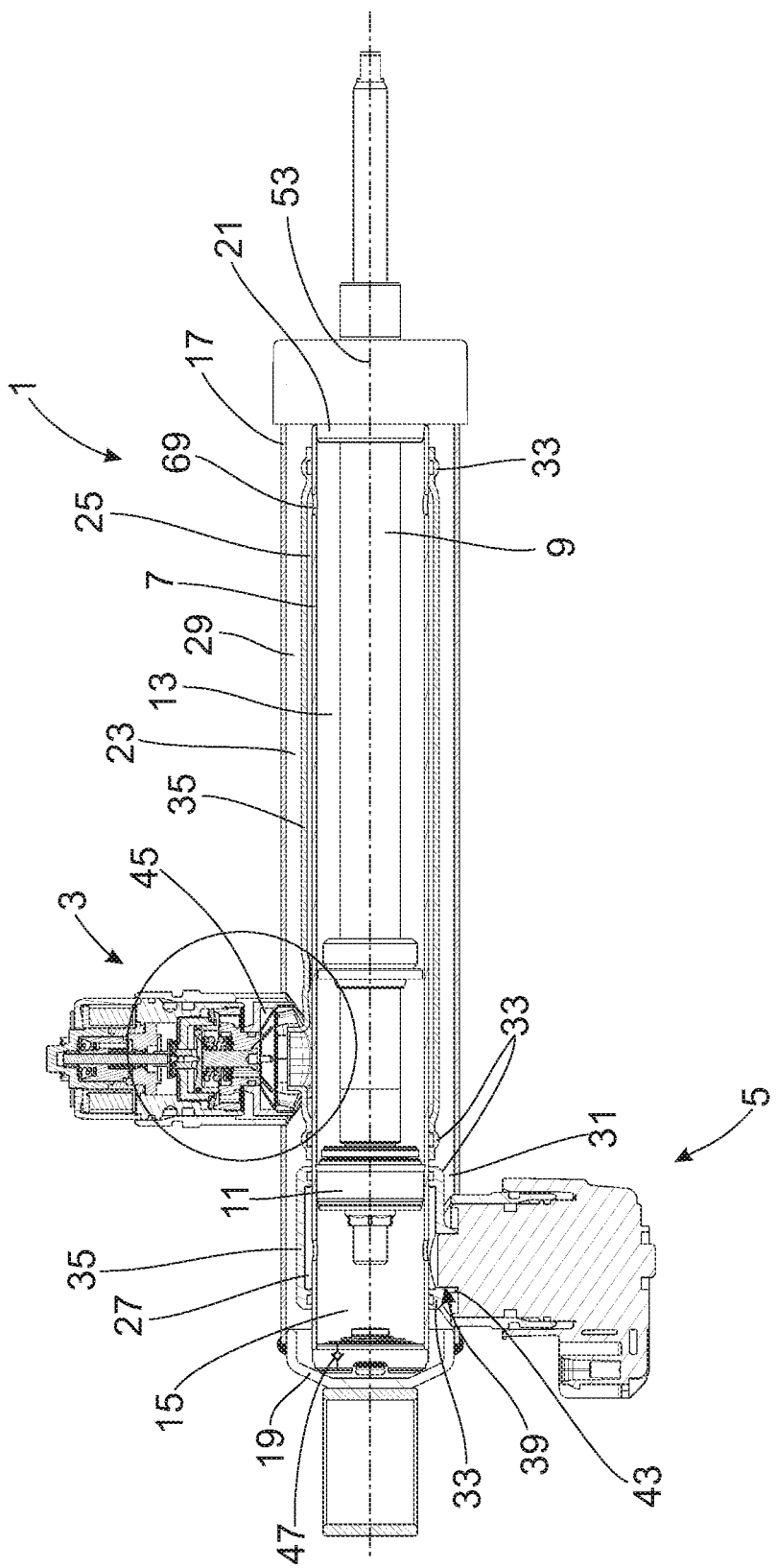
FIG. 1 is an overall view of a vibration damper with two adjustable damping valves.

FIG. 1 shows an adjustable vibration damper 1 with at least one adjustable damping valve 3; 5 for each working direction. An adjustable damping valve 3; 5 of this type is known, for example, from DE 10 2013 218 658 A1 005650. A piston rod 9 is guided together with a piston 11 so as to be axially displaceable inside a cylinder tube 7. The piston 11 divides the cylinder tube 7 into a working space 13 on the piston rod side and a working space 15 remote of the piston rod. "Divided" is to be understood above all in terms of space creation. Optionally, damping valves or pressure relief valves can be arranged in the piston 11.

The cylinder tube 7 is enclosed by an outer receptacle tube 17. A terminal base 19 and a piston rod guide 21 close the receptacle tube 17 and the cylinder tube 7. An annular space between the cylinder tube 7 and the receptacle tube 17 forms a compensation space 23 which is filled partially with damping medium and partially with a pressurized gas. The compensation space 23 compensates the volume displaced by the piston rod 9 during a movement of the piston rod, i.e., a volume increase of a working chamber 13; 15 is always connected with a removal of damping medium from the compensation space 23 into the respective working space.

A first fluid connection 25 is provided between the working space 13 on the piston rod side and a first of two adjustable damping valves 3; 5, and a second fluid connection 27 is provided between the working space 15 remote of the piston rod and a second damping valve of the two damping valves 3; 5, a separate intermediate tube 29; 31 being used for each fluid connection. Each intermediate tube 29; 31 abuts the cylinder tube 7 with sealed guide portions 33. In addition to a tube body 35, each intermediate tube 29; 31 has a connection orifice 37; 39 which is formed by a connection piece 41; 43. Each connection orifice 37; 39 opens directly into the respective adjoining adjustable damping valve.

A check valve 45; 47 is hydraulically connected in parallel with each adjustable damping valve 3; 5. In the case of the second damping valve 5, the check valve function 47 is taken over by a bottom valve, known per se. For the first adjustable damping valve 3, the check valve 45 is held by the intermediate tube 29 forming the fluid connection 25. A check valve body 49 of the check valve 45 is supported at least indirectly in the region of connection orifice 37, specifically at the connection piece 41 forming the connection orifice 37.

Figure 2:
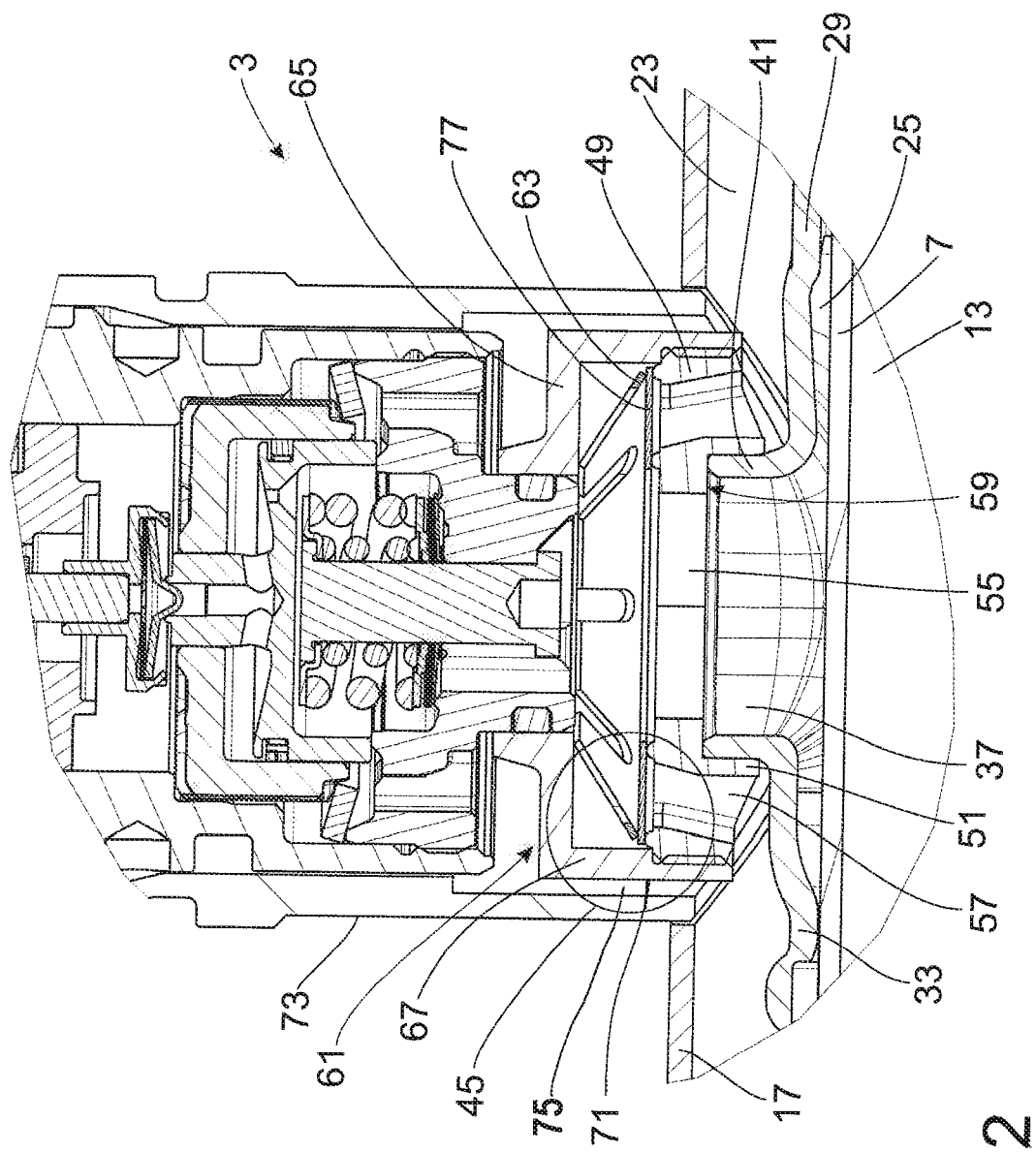
FIG. 2 shows a detail from FIG. 1.

As can be seen particularly from FIG. 2, the check valve body 49 of check valve 45 outwardly encloses connection piece 41. Accordingly, the entire cross section of connection orifice 37 is available as flow cross section.

For this purpose, check valve body 49 has a guide sleeve 51 in axial overlap with connection piece 41. The overlap takes on a sealing function and an axial holding function of check valve 45 with respect to a longitudinal axis 53 of the vibration damper 1.

Check valve body 49 has a permanently open through-opening 55 to adjustable damping valve 3 and at least one return flow orifice 57 which is radially offset with respect to the latter. The at least one return flow orifice 57 is arranged radially outside of the permanently open through-opening 55. Accordingly, a comparatively large total cross section is available for the return flow orifices 57 which are arranged on a larger pitch circle.

For radial fixing, check valve body 49 has a supporting surface 59 via which check valve body 49 is supported at intermediate tube 29. For additional bearing support, check valve body 49 is held by a transition piece 61 to adjustable damping valve 3. Transition piece 61 has a pot-shaped basic shape and is fixedly connected to check valve body 49.

A closing spring 63 of check valve 45 is supported at a base 65 of transition piece 61. Closing spring 63 is also radially supported at transition piece 61. A circumferentially extending wall 67 of transition piece 61 extending from base 65 serves this purpose.

During an extending movement of the piston rod, the working space 13 on the piston rod side is compressed. The displaced damping medium flows via a fluid connection 69 in cylinder tube 7 just below guide portion 33 into the first fluid connection 25 to the first adjustable damping valve 3. When the damping fluid has passed the adjustable damping valve, it can flow into the compensation space 23 through an annular channel 75 formed by an outer lateral surface 71 of transition piece 61 and by a tube connection piece 73 on the receptacle tube side.

During this extending movement of the piston rod, the working space 15 remote of the piston rod enlarges. The volume increase of working space 15 is compensated by an influx of damping medium from compensation space 23 via check valve 47 as part of the bottom valve.

When piston rod 9 moves into cylinder tube 7, damping medium is displaced from the working space 15 remote of the piston rod into second adjustable damping valve 5 via a second fluid connection 70. In so doing, damping medium flows out of adjustable damping valve 5 into compensation space 23 and damping medium is simultaneously removed from compensation space 23 and guided back into first fluid connection 25 via return flow orifices 57 which are opened as a result of the lifting movement of a valve disk 77 of check valve 45 and via the permanently open through-opening 55.

Figure 3:
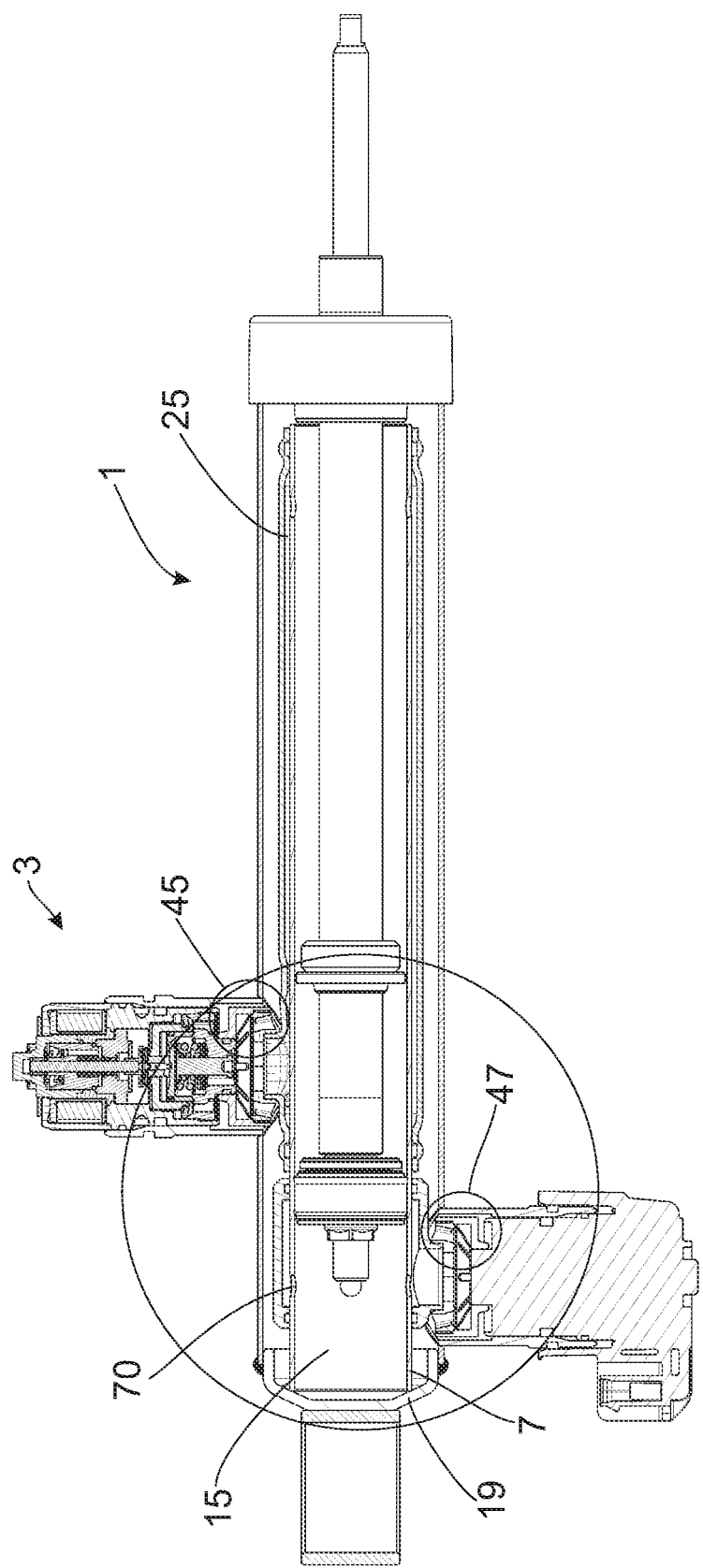
FIG. 3 shows the vibration damper according to FIG. 1 without bottom valve.
Figure 4:
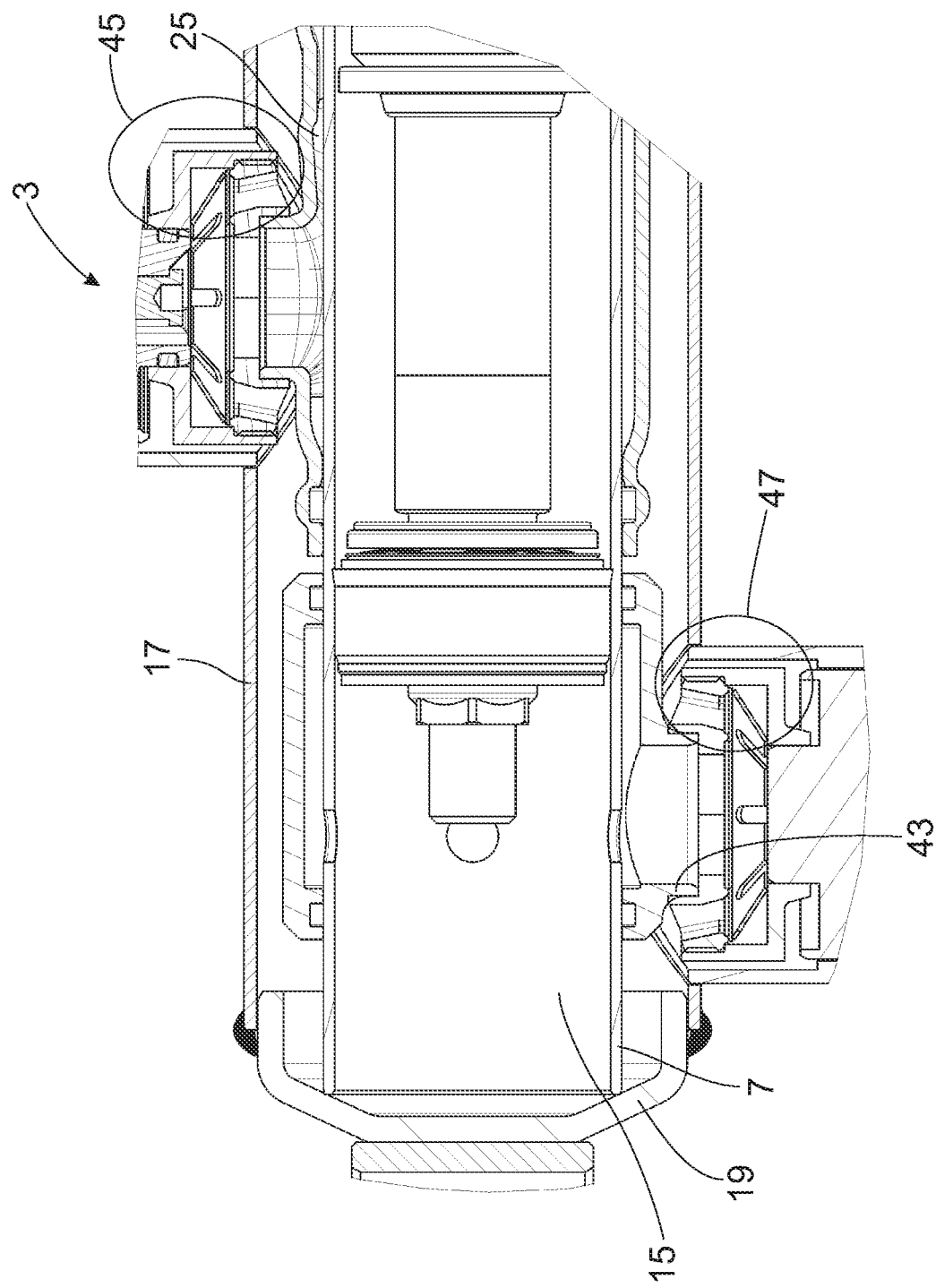
FIG. 4 is a detailed view from FIG. 3.

FIGS. 3 and 4 show an embodiment which is identical to the construction according to FIGS. 1 and 2 in connection with first fluid connection 25 and check valve 45 for the first adjustable damping valve 3. In contrast, check valve 47 is connected in parallel with adjustable damping valve 5 for damping a compression movement of the working space 15 remote of the piston rod, and the working space 15 remote of the piston rod is separated from compensation space 23 via the terminal closed base 19 of the outer receptacle tube 17. Finally, the second check valve 47 corresponds in every respect to the function of the first check valve 45 at the first adjustable damping valve. In contrast to FIG. 1, there is no conventional bottom valve provided. Instead of flowing back out of compensation space 23 via the bottom valve, the damping medium also flows in this case through the open check valve 47 at connection piece 43.

Figure 5:
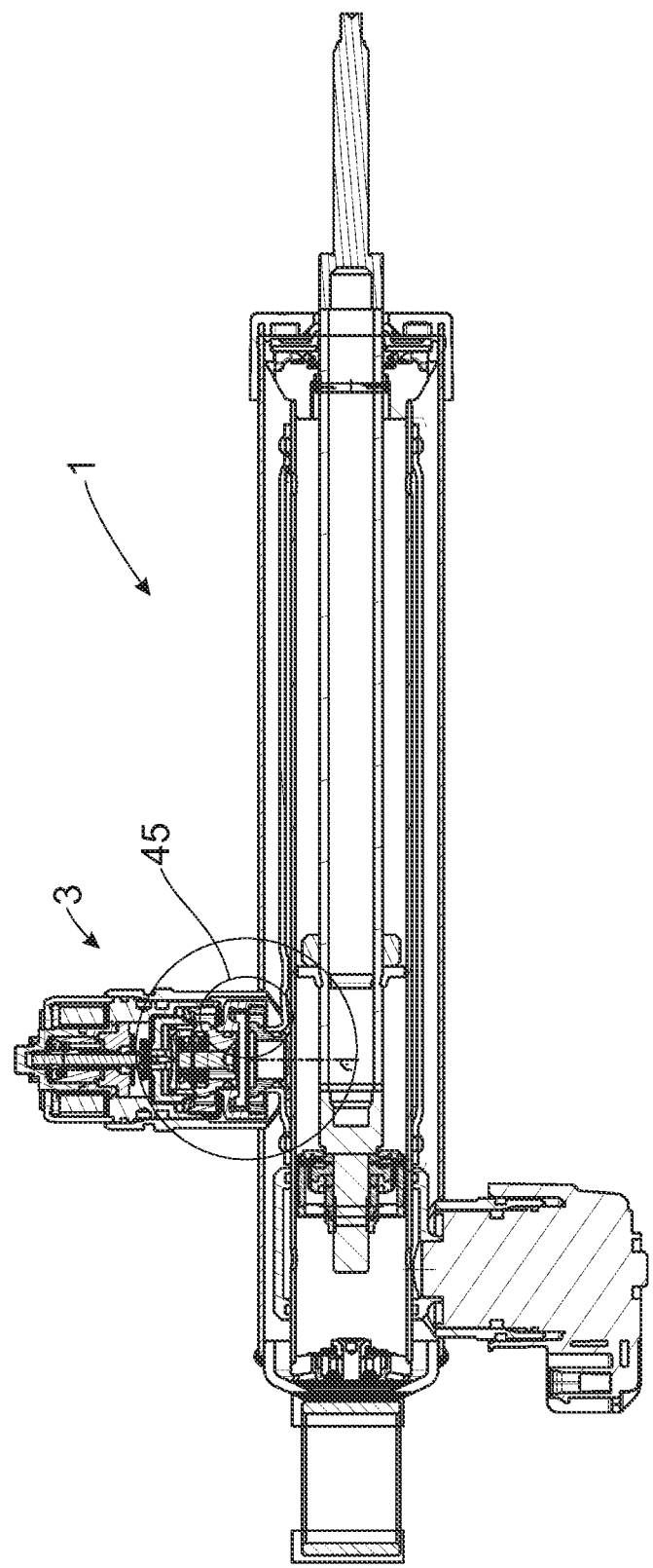
FIG. 5 shows a further alternative embodiment to FIG. 1.
Figure 6:
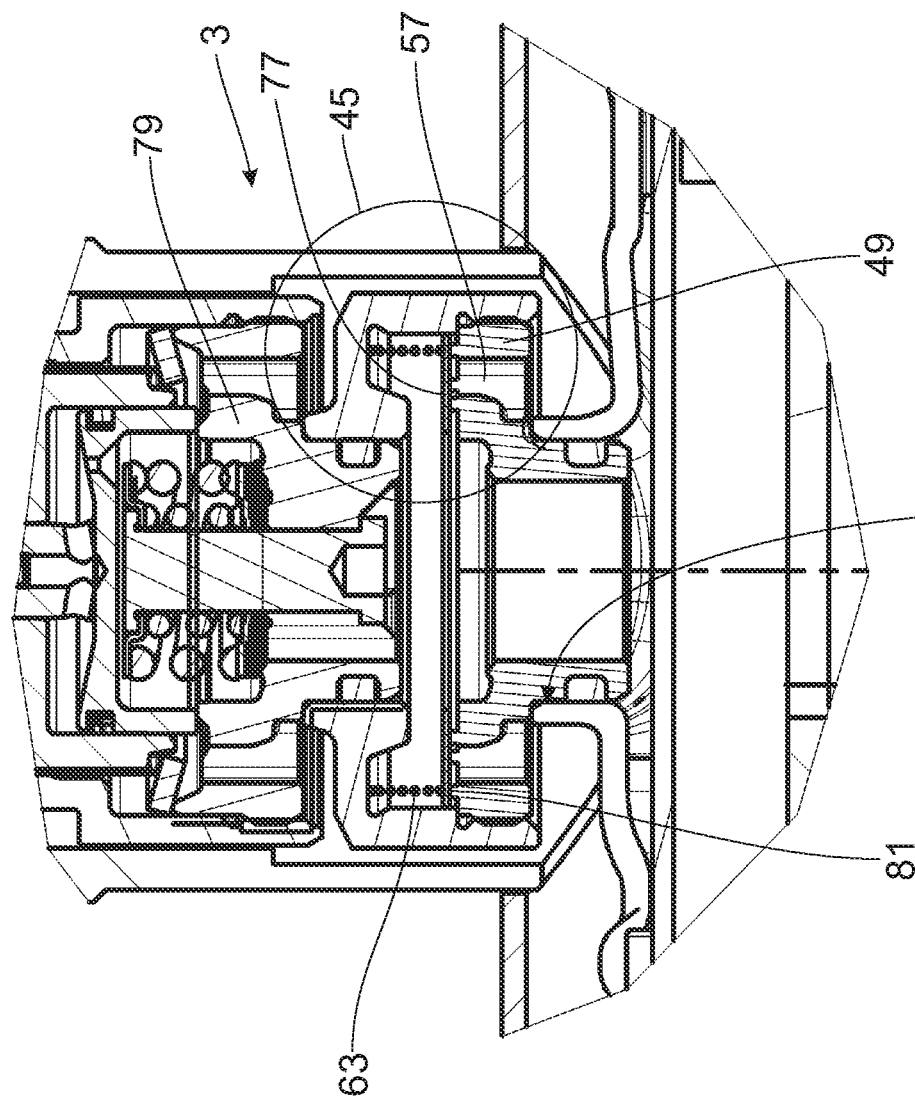
FIG. 6 shows a detailed view from FIG. 5.

Viewed in conjunction, FIGS. 5 and 6 show a n embodiment based on the construction according to FIG. 1. In contrast, check valve body 49 engages in connection orifice 37. In principle, the diameter of check valve body 49 could be reduced or the total cross section for return flow orifices 57 could be increased. This view should show additionally that transition piece 61 for check valve 45; 47 and an inlet connection piece 79 into the adjustable damping valve 3; 5 could be dimensioned based on a common blank. A check valve body 49 can be fashioned from the inlet connection piece 79 simply by post-machining the blank, particularly the permanent through-opening 55 and a valve seat surface 81 for valve disk 77 of check valve 45; 47.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An adjustable vibration damper comprising:
a piston movable in two opposed working directions;
at least one adjustable damping valve for each working direction;
a fluid connection between a compensation space and a working space;
a check valve for controlling said fluid connection;
said check valve having a check valve body and being hydraulically connected in parallel with said adjustable damping valve;
an intermediate tube constructed to form said fluid connection and to hold said check valve; said intermediate tube having a connection orifice to said adjustable damping valve and wherein said check valve body of said check valve is supported at least indirectly in the region of said connection orifice;
additionally comprising a connection piece forming said connection orifice and wherein said check valve body is supported at said connection piece;
wherein said check valve body outwardly encloses said connection piece; and
wherein said check valve body comprises a guide sleeve in axial overlap with said connection piece.

2. The adjustable vibration damper 1, wherein said check valve body engages in said connection orifice.

3. The adjustable vibration damper according to claim 1, wherein said check valve body comprises a permanently open through-opening to said adjustable damping valve and at least one return flow orifice radially offset with respect to said through-opening.

4. The adjustable vibration damper according to claim 3, wherein said at least one return flow orifice is arranged radially outside of said permanently open through-opening.

5. The adjustable vibration damper according to claim 1, wherein said check valve body comprises a supporting surface for supporting said check valve body at said intermediate tube.

6. The adjustable vibration damper according to claim 1, additionally comprising a transition piece; and wherein said check valve body is held by said transition piece to said adjustable damping valve.

7. The adjustable vibration damper according to claim 6, wherein said transition piece and said check valve body are fixedly connected to one another.

8. The adjustable vibration damper according to claim 6, wherein said check valve additionally comprises a closing spring supported at said transition piece.

9. The adjustable vibration damper according to claim 8, wherein said closing spring is radially supported at said transition piece.

10. The adjustable vibration damper according to claim 1, additionally comprising a terminal closed base and wherein said check valve is connected in parallel with said adjustable damping valve for damping a compression movement of a said working space remote of said piston rod, and said working space remote of said piston rod is separated from said compensation space via said terminal closed base.

* * * * *